United States Patent [19]
Grotz

[11] 3,971,534
[45] July 27, 1976

[54] METHOD OF AND APPARATUS FOR CONTROLLING FLOW ATTACHMENT TO THE WING AND FLAP SURFACES OF AN UPPER SURFACE BLOWING TYPE AIRCRAFT

[75] Inventor: Charles A. Grotz, Seattle, Wash.
[73] Assignee: The Boeing Company, Seattle, Wash.
[22] Filed: Dec. 28, 1973
[21] Appl. No.: 429,658

[52] U.S. Cl. .................... 244/42 CD; 239/265.33; 244/53 R
[51] Int. Cl.² ........................................ B64C 21/00
[58] Field of Search............ 244/42 CC, 42 CD, 52, 244/53 R, 40 R, 130; 60/230, 271; 239/265.13, 265.19, 265.25, 265.33, 265.37

[56] References Cited
UNITED STATES PATENTS

| 2,564,671 | 8/1951 | Brown............................ 239/265.25 |
| 3,018,983 | 1/1962 | Davidson............................. 244/15 |
| 3,126,171 | 3/1964 | Stepniewski et al.............. 60/271 X |
| 3,432,100 | 3/1969 | Hardy et al................. 239/265.37 X |
| 3,442,471 | 5/1969 | Fischer et al. .................... 244/53 R |
| 3,598,319 | 8/1971 | Howard et al. ...................... 60/229 |
| 3,837,601 | 9/1974 | Cole .............................. 244/42 DB |
| 3,844,375 | 10/1974 | Manca et al.............. 239/265.13 X |

FOREIGN PATENTS OR APPLICATIONS

| 1,418,303 | 10/1965 | France ............................ 244/53 R |
| 702,290 | 3/1966 | Italy........................................ 244/52 |
| 887,021 | 1/1962 | United Kingdom................... 60/271 |

Primary Examiner—Trygve M. Blix
Assistant Examiner—Barry L. Kelmachter
Attorney, Agent, or Firm—Christensen, O'Connor, Garrison & Havelka

[57] ABSTRACT

A method of controlling flow attachment to the wing and flap surfaces of an upper surface blowing type aircraft by horizontally controlling the divergence of the jet exhaust of the aircraft engines to control the vertical thickness of the exhaust is disclosed. In addition to controlling the thickness of the exhaust, control of the divergent exhaust also provides control over the outward velocity component of the exhaust which further provides control over flow attachment by controlling the flow of ambient air under the jet exhaust. In one form, the apparatus of the invention comprises one or more side panels, located at the end of the engine exhaust nozzle, adjacent to the surface of the wing. When the panels are moved outwardly, openings are formed which allow the exhaust to horizontally diverge. When the panels are moved inwardly, the openings are closed and the exhaust is no longer diverted and thinned. In an alternate form, the apparatus of the invention comprises movable vanes mounted on the wing, slightly rearwardly of the end of the exhaust nozzle. The vanes are movable so as to either divert the exhaust outwardly and thin it, or to be aligned with the exhaust stream to have little or no effect on the exhaust whereby it remains unthinned.

11 Claims, 9 Drawing Figures

METHOD OF AND APPARATUS FOR CONTROLLING FLOW ATTACHMENT TO THE WING AND FLAP SURFACES OF AN UPPER SURFACE BLOWING TYPE AIRCRAFT

BACKGROUND OF THE INVENTION

This invention is directed to jet aircraft and more particularly to controlling the augmenting lift used by upper surface blowing aircraft during low speed operation, such as during take-off and landing.

Various types of short take-off and landing (STOL) and vertical take-off and landing (VTOL) aircraft have been proposed and are in use. In general, these aircraft include some form of means for augmenting or entirely replacing the aerodynamic lift of the wings during low speed, particularly take-off and landing, operation.

One type of aircraft that includes a method of and an apparatus for augmenting the aerodynamic lift created by its wings during low speed operation is an upper surface blowing aircraft. An upper surface blowing aircraft utililzes jet engines mounted so that the jet exhaust occurs above the wings, rather than below the wings, as in conventional aircraft. The upper surface exhaust, during low speed operation, is "turned" downwardly over extended flaps located at the rear of the wing surface. The "turning" of the exhaust occurs without external mechanical means, in accordance with the well known Coanda effect. The downwardly directed exhaust provides the desired lift augmentation during low speed operation, particularly during take-off and landing.

One of the problems with upper surface blowing aircraft relates to the cross-sectional configuration of the jet exhaust. A standard, relatively thick, jet exhaust will not follow the curve created by the extended flap. That is, for the Coanda effect to take place, the negative pressure on the side of the exhaust adjacent to the wing must be adequate to overcome the tendency of the exhaust to follow a straight line. As the thickness of the exhaust diminishes, the amount of negative pressure necessary to "turn" the exhaust also diminishes, assuming that the radius of curvature over which the exhaust is to turn remains the same (i.e., the amount of negative pressure is also inversely related to the radius of curvature). In other words, if the exhaust, vertically, is relatively thick, it will separate from the wing and flap and now flow downwardly as desired. On the other hand, a jet engine exhaust is required to provide satisfactory performance under both low speed (usually take-off and landing) and high speed (cruise) conditions.

Previously, conventional jet aircraft (under the wing exhaust) have been able to obtain acceptable performance under both conditions with fixed exhaust nozzle geometry. However, such is not the case with upper surface blowing aircraft that use a Coanda flap system (a flap system that utilizes a Coanda effect) to deflect the jet engine exhaust downwardly to obtain a powered lift that augments (STOL) or replaces (VTOL) conventional aerodynamic lift. More specifically, as explained above, effective Coanda flow turning can only occur if the height (thickness) of the nozzle flow is limited to a certain percentage of the radius of curvature of the flap. If this limit is not met, the negative pressure naturally occurring on the wing upper surface side of the exhaust will be inadequate to turn the exhaust over the flap. Since flap size limits generally restrict the radius of flap curvature, they consequently limit the maximum exhaust flow thickness which can be turned.

One possible solution of the foregoing problem is to direct the exhaust flow downwardly, at high angles relative to a horizontal plane, by deflectors or nozzle inclination. However, this solution is unsatisfactory because the effective area of the nozzle is low at take-off and high at cruise which can result in engine nozzle mismatch and/or poor performance under high speed (cruise) conditions. Moreover, the nozzle area increase at cruise cuts the boost compressor stall margin. If the nozzle is sized for cruise to overcome this disadvantage, at take-off, an under area nozzle exhaust condition exists which can decrease the fan stall margin to below a minimum acceptable level and/or reduce take-off thrust proportionally to the nozzle area decrease. An alternative solution is to decrease exhaust thickness by shaping the nozzle so that the exhaust flow is spread over a large area of the wing. A very wide fixed nozzle can be utilized to obtain the desired spreading, and resultant thinning, of the jet exhaust. However, such a solution also results in cruise disadvantages. For example, it has been found that a wide nozzle, suitable for low speed performance, has an effective nozzle velocity coefficient which is less than desired during cruise. In addition, a wide nozzle or high aspect ratio nozzle has high cruise drag and high weight. These disadvantages result in increased cruise fuel consumption, and an equivalent loss in range.

Therefore, it is an object of this invention to provide a method of and an apparatus for controlling jet exhaust flow attachment to the wing and flap surfaces of an upper surface blowing type aircraft.

It is a further object of this invention to provide a method of and an apparatus for promoting flow attachment to the wing and flap surfaces of upper surface blowing type aircraft only during low speed flight and not during high speed flight.

It is also an object of this invention to provide an apparatus for controlling the divergence of the jet engine exhaust of an upper surface blowing type aircraft so as to promote Coanda effect flow attachment to the associated wing and flap of the aircraft.

It is a still further object of this invention to provide a new and improved engine, wing and flap combination suitable for use in an aircraft.

It is yet another object of this invention to provide an upper surface blowing engine, wing and flap combination suitable for use in an aircraft.

SUMMARY OF THE INVENTION

In accordance with principles of this invention, a method of controlling the flow attachment of the jet exhaust of an upper surface blowing type aircraft to the wing and flap surfaces of the aircraft is provided. The method comprises the steps of: limiting the divergence of the jet exhaust during high speed (cruise) flight when the flaps are retracted; and, horizontally diverting the jet exhaust during low speed (take-off and landing) flight when the flaps are extended.

In accordance with further principles of this invention, the divergence of the jet exhaust is controlled as it is emitted from the jet engine. In accordance with alternate principles of this invention, the divergence of the jet exhaust is controlled immediately subsequent to its being emitted from the jet engine.

In accordance with further principles of this invention, an apparatus for controlling flow attachment of the jet exhaust of a jet engine mounted on the wing of an upper surface blowing type aircraft to the wing and flap surfaces thereof is provided. In one form, the apparatus of the invention comprises a panel or panels mounted on one or both sides of the exhaust nozzle of the jet engine. The panels are movable between a closed position wherein the horizontal divergence of the exhaust is restricted and an open position wherein the horizontal divergence of the exhaust is less restricted. In an alternate form, the apparatus of the invention comprises one or more movable vanes located immediately behind the nozzle of the jet engine. In one extreme position, the vanes have very little divergence effect on the jet exhaust. In another extreme position, the vanes divert the jet exhaust outwardly so that it is vertically thinned.

It will be appreciated from the foregoing brief summary that the invention provides a method of promoting the flow attachment of the jet exhaust of an upper surface blowing type aircraft to the associated wing of the aircraft. In addition, the invention provides apparatus for carrying out the method. In a high speed or cruise mode of operation minimal horizontal divergence of the jet exhaust is created. Thus, the jet exhaust is relatively thick. The thick jet exhaust has minimal flow attachment resulting in low wing scrubbing drag and loss. On the other hand, in a low speed, or take-off and landing mode of operation, the jet exhaust is horizontally diverged. This horizontal divergence thins the jet exhaust so that it will follow the downward extension of the flaps and provide a thrust or lift component. The apparatus of the invention provides these beneficial results without being unduly complex. Rather, uncomplicated panels or vanes are all that is needed to create the desired effect. Any suitable electromechanical, pneumatic, etc., system can be utilized to control the positioning of such panels or vanes.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
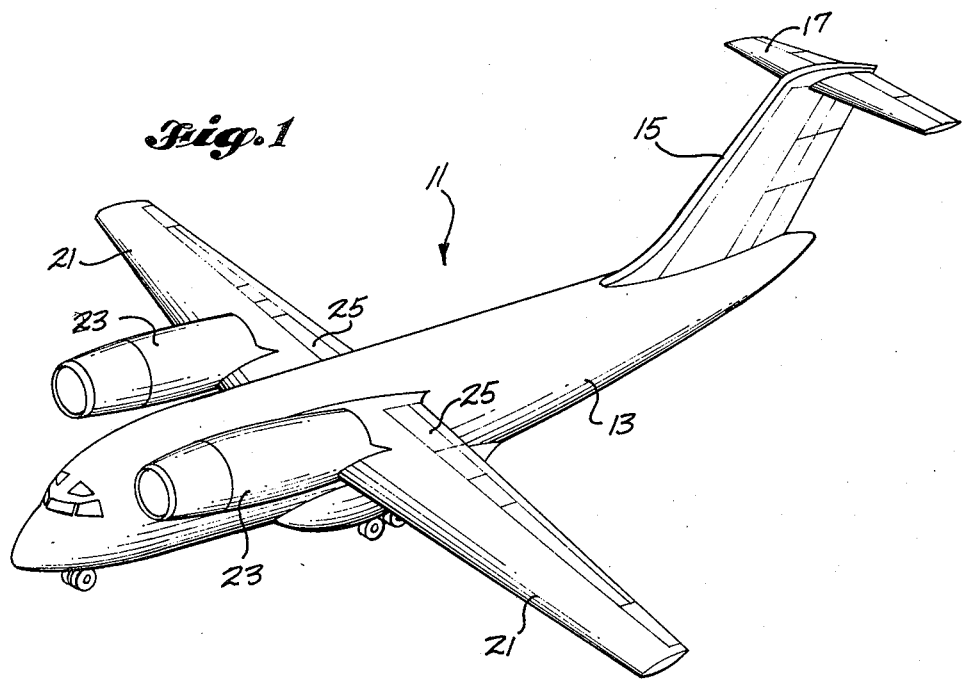
FIG. 1 is a perspective view of an upper surface blowing type aircraft.

FIG. 1 illustrates an upper surface blowing type aircraft 11. Such an aircraft may be a short take-off and landing (STOL) or a vertical take-off and landing (VTOL) aircraft. By way of example, the aircraft 11 illustrated in FIG. 1 is a short take-off and landing aircraft. In any event, the aircraft 11 comprises a fuselage 13, a vertical stabilizer 15, a horizontal stabilizer 17, wings 21, and engines 23. The engines 23 are turbojet or turbo-fan engines and are attached to the wings 21 in a manner such that the jet exhaust passes over the upper surface of the associated wing 21 and upper surface blowing (USB) flap 25. The particular configuration illustrated in FIG. 1 comprises inboard engines 23 located relatively near to the fuselage 13. However, the hereinafter described invention can also be used in combination with outboard engines (engines located further away from the fuselage).

Figure 2:
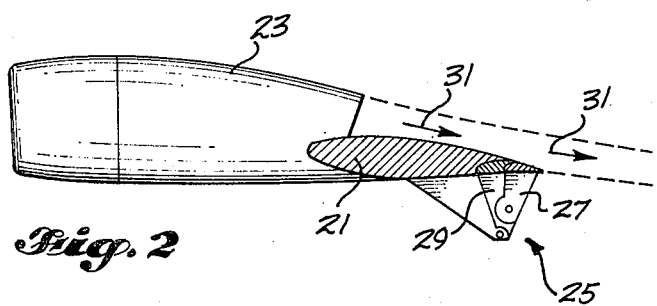
FIG. 2 is a cross-sectional schematic view of the engine, wing and flap of an upper surface blowing type aircraft in a high speed (cruise) mode of operation.

FIG. 2 is a cross-sectional view illustrating one of the wings 21, one of the engines 23 and one of the USB flaps 25 configured for high speed (cruise) operation. More specifically, the USB flap 25 comprises two sections 27 and 29. During cruise, the two sections are withdrawn to the illustrated position. The engine exhaust 23, as illustrated by the arrows 31, passes over the upper surface of the wing 21 and the withdrawn USB flap 25, and then exits rearwardly from the trailing edge of the withdrawn USB flap 25, preferably with little or no surface attachment.

Figure 3:
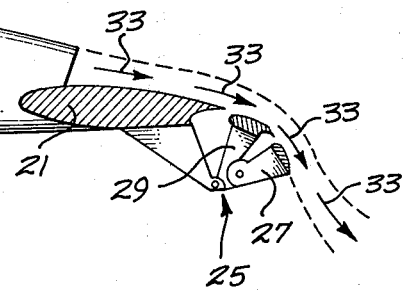
FIG. 3 is a cross-sectional schematic view of an engine, wing and flap of an upper surface blowing type aircraft in a low speed (take-off and landing) mode of operation.

FIG. 3 illustrates an engine, wing and USB flap of the type illustrated in FIG. 2 configured for low speed (take-off and landing) operation. During take-off and landing, the two sections 27 and 29 of the USB flap are extended. As can be seen in FIG. 3, when extended, the two sections form an upper surface that curves rearwardly and downwardly in a generally smooth manner, i.e., there is no sharp breakpoint. In accordance with the principles of operation of an engine, wing and flap of the type illustrated in FIG. 3, as illustrated by the arrows 33, the exhaust from the engine 23 curves downwardly about the extended flap 25 and, thus, forms a downward thrust vector which provides lift. In other words, in accordance with the Coanda effect, the exhaust from the jet engine 23 turns as it passes over the wing and flap surface and projects downwardly (and slightly rearwardly). The downward projection creates a thrust vector component which tends to lift the aircraft. This lifts augments the lift created by the aerodynamic configuration of the wing 21.

One of the problems associated with an engine, wing and flap configuration of the type illustrated in FIGS. 2 and 3 is that a thick exhaust from the engine 23 will not turn around the flap surface in the absence of adequate negative pressure occurring on the remote side of the exhaust. More specifically, whether or not the jet exhaust will curve or turn about the downwardly extending flaps depends upon the radius of the curvature of the flaps, the amount of negative pressure, and the thickness of the exhaust, among other factors. Assuming that the radius of curvature, and all other factors are fixed, whether or not the exhaust will turn depends upon the thickness of the exhaust. Thus, it is desired to vertically thin the exhaust so that it will bend in the desired manner. The method and apparatus of the invention provide the desired exhaust thinning.

In accordance with the method of the invention, the exhaust of the engine 23 is thinned by causing the exhaust to diverge under low speed conditions i.e., during take-off and landing, when the flaps are down and a downward thrust vector is desired. Under cruise conditions, the exhaust is unthinned. Such divergency may be created by changing the configuration of the exhaust nozzle of the jet engine 23 between a cruise configuration and a take-off and landing configuration. Alternatively, divergency may be created by directing the exhaust outwardly immediately after it exits from the exhaust nozzle of the engine 23. In either event, the exhaust is horizontally diverged during low speed (take-off and landing) and not diverged during high speed (cruise) operations. During low speed operations the thinned exhaust easily turns about the extended flap surfaces. During high speed operations there is minimum flow attachment and, thus, little or no turning about the withdrawn flap surfaces.

Depending upon the location of the engine, the exhaust may be only diverged outwardly from the fuselage. Such will be the case when the engine is located inboard, i.e., close to the fuselage. Alternatively, the exhaust can be diverged in both horizontal directions, i.e., toward and away from the fuselage. Such will be the case when the engine is located outboard from the fuselage.

In addition to providing a method of thinning the exhaust of the jet engine and thereby promoting flow attachment to the wing and flaps, the invention also provides apparatus for carrying out the method.

Figure 4:
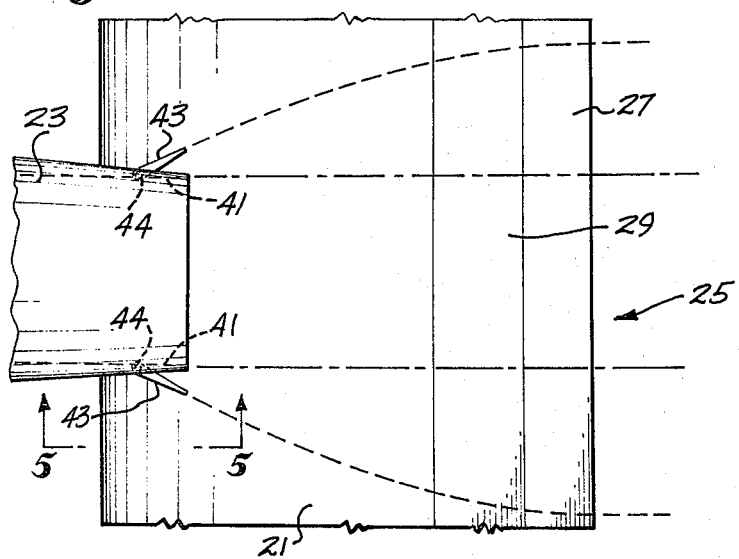
FIG. 4 is a top view of an engine, wing and flap illustrating one apparatus formed in accordance with the invention.
Figure 5:
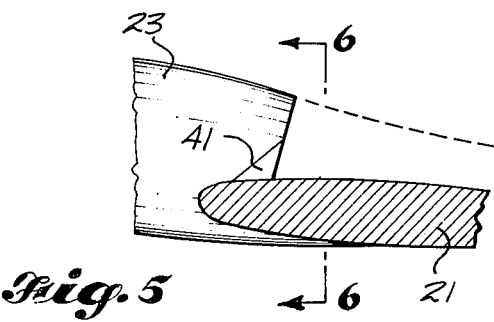
FIG. 5 is a cross-sectional view along line 5—5 of FIG. 4.
Figure 6:
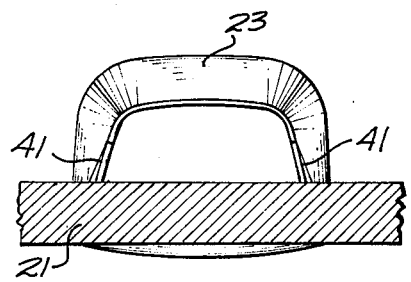
FIG. 6 is a cross-sectional view along line 6—6 of FIG. 5.

FIGS. 4 through 6 illustrate one apparatus formed in accordance with the invention for controlling the horizontal divergence of the exhaust of a jet engine 23 of an upper surface blowing aircraft. FIG. 4 illustrates the nozzle of one of the jet engines 23 mounted on one of the wings 21. The trailing edge of the wing 21 is formed by one of the USB flaps 25 comprising first and second sections 27 and 29. As best illustrated in FIGS. 5 and 6, formed in the lower portion of the exhaust nozzle of the engine 23, adjacent the upper surface of the wing 21, are openings 41. FIGS. 4 and 6 illustrate two openings, one located on either side of the engine. However, only a single outer opening may be utilized, if desired. More specifically, normally two openings will be included if the aircraft engines are outboard engines (i.e., remote from the fuselage) and a single opening included if the aircraft engines are inboard (i.e., close to the fuselage).

Panels 43 illustrated in FIG. 4 only are attached to the nozzle of the jet engine 23 by hinge pins 44, or any other suitable means which allows the panels to move inwardly and outwardly. The panels are positioned such that they close the openings and prevent divergence of the jet exhaust when in their inward positions. In their outward positions, the panels "open" and allow the jet exhaust to diverge outwardly. The inward position is the cruise or high speed position (thick exhaust). The outward position is the low speed, or take-off and landing, position (thin exhaust). Thinning automatically occurs as the panel or panels are moved to their outward positions. Because the exhaust thins, it tends to follow the curved surface created by the downwardly extending flaps, in accordance with the well known Coanda effect.

It will be appreciated by those skilled in the art that any type of suitable control mechanism can be utilized to control the opening and closing of the panels 43. For example, an electromechanical system can be utilized. Alternatively, a hydraulic, pneumatic or entirely mechanical system can be utilized, if desired. In addition, a suitable electronic control mechanism for automatically controlling the opening and closing of the panels, in conjunction with the raising and lowering flaps can be provided if desired.

Figure 7:
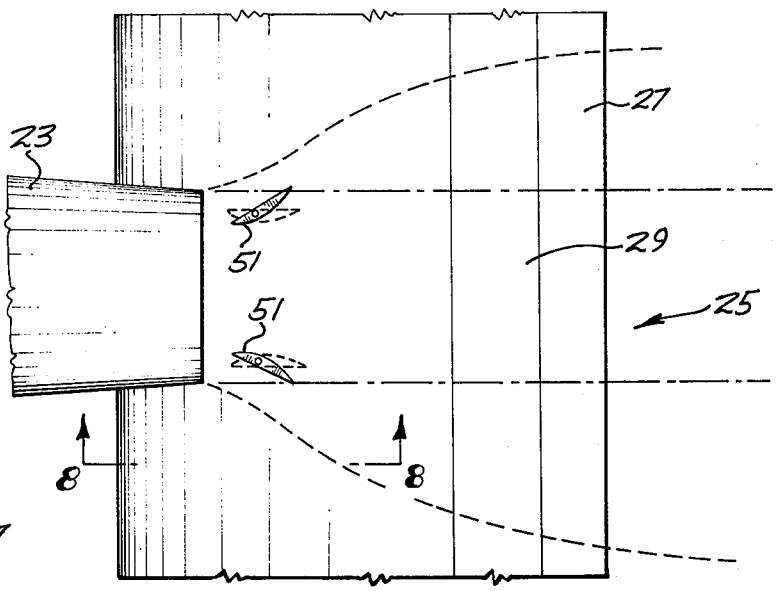
FIG. 7 is a top view of an engine, wing and flap and illustrates an alternative apparatus formed in accordance with the invention.
Figure 8:
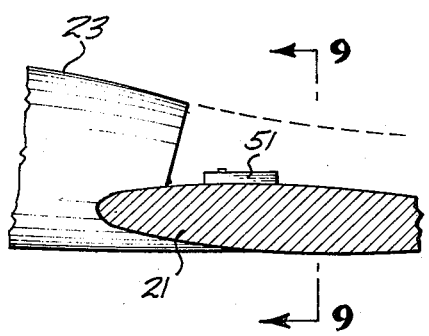
FIG. 8 is a cross-sectional view along line 8—8 of FIG. 7.
Figure 9:
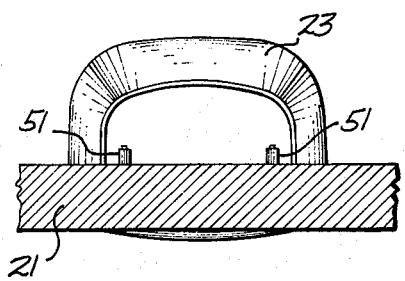
FIG. 9 is a cross-sectional view along line 9—9 of FIG. 8.

FIGS. 7 through 9 illustrate an alternate embodiment of the invention. FIG. 7 includes an illustration of the rear end of the nozzle of the engine 23, a portion of the wing 21 and a portion of the USB flap 25 including the first and second sections 27 and 29. Divergence of the jet exhaust is created by vanes 51 mounted on the wing 21 immediately to the rear of the nozzle of the engine 23. The vanes are mounted on the upper surface of the wing 21 and are located slightly inwardly from the outer sides of the nozzle, 23, i.e., they are closer to the centerline of the nozzle than are the sides of the nozzle. In any event, the vanes 51 are airfoil shaped in cross section, as seen in FIG. 7. The low pressure surfaces of the vanes lie on the sides of the vanes nearest the centerline of the engine nozzle and the high pressure surfaces are on the sides of the vanes most remote from this centerline. The vanes project upwardly at generally right angles to the upper surface of the wing 21. The vanes are rotatable about generally vertical axes between a position (dotted in FIG. 7) wherein the chords of the vanes are essentially parallel to the centerline of the nozzle to a position (solid in FIG. 7) wherein the chords are at acute angles with respect to this centerline. As with the panels 43, any suitable type of mechanical, electro-mechanical, pneumatic or hydraulic mechanism can be utilized to move the vanes between these positions.

In the cruise mode of operation, the vanes have their chords generally aligned parallel to the centerline of the exhaust thereby creating little or no divergence. On the other hand, in the take-off and landing mode of operation, when divergence of the jet exhaust is desired, the vanes are rotated to a position such that their chords are at acute angles with respect to the centerline of the exhaust. The angular position, of course, controls the amount of divergence and thus, the thickness of the resultant exhaust. It should be noted that the vanes are located quite close to the end of the nozzle of the jet engine 23 to provide for immediate divergence of the exhaust. In addition, it will be appreciated that only a single outboard vane 51 may be utilized if it is desired to only diverge the jet exhaust outwardly, such as would be the case for an upper surface blowing aircraft having its engines located close to the fuselage.

It will be appreciated from the foregoing description of preferred embodiments of the invention that the apparatus of the invention carries out the method of the invention in an uncomplicated fashion. That is, the apparatus provides an uncomplicated means for controlling flow attachment of the jet exhaust. As will be appreciated by those skilled in the art and others, because the exhaust is thinned during low speed operations, it tends to follow the then downwardly extended flaps, in accordance with the Coanda effect. If the exhaust is not adequately thin, it will not follow the downward extension of the flaps because the negative pressure formed on the wing and flap surface will be inadequate to cause the exhaust to turn around the flaps. On the other hand, the thick exhaust occurring during high speed operation has little tendency to follow the shape of the wing/flap surface; thus, there is little wing scrubbing drag and loss due to flow divergence.

While preferred embodiments of the invention have been illustrated and described, it will be appreciated by those skilled in the art and others that various changes can be made therein without departing from the spirit and scope of the invention. Hence, the invention can be practiced otherwise than as specifically described herein.

The embodiments of the invention in which exclusive property or privilege is claimed are defined as follows:

1. In an upper surface blowing aircraft wherein a jet exhaust generated by a jet engine is emitted above the upper surface of a wing and flap and flows chordwise thereover so as to attach to said upper surface under a predetermined set of conditions, a method of controlling said jet exhaust flow attachment to said upper surface of said wing and flap comprising the step of varying only the horizontal divergence of said jet exhaust as it is emitted by said jet engine above said upper surface of said wing and flap so as to control the vertical thickness of said jet exhaust and its attachment to said upper surface.

2. A method of controlling jet exhaust flow attachment to the wing and flap surfaces of an upper surface blowing aircraft as claimed in claim 1 wherein said control occurs as the jet exhaust flow is emitted from the jet engine.

3. A method of controlling jet exhaust flow attachment to the wing and flap surfaces of an upper surface blowing aircraft as claimed in claim 1 wherein said control occurs immediately subsequent to the jet exhaust flow being emitted from the jet engine.

4. In an upper surface blowing aircraft including at least one jet engine and a wing and flap surface, said jet engine being mounted in a position such that the jet exhaust created by said jet engine is emitted from the nozzle of said jet engine above the upper surface of said wing and flap so as to flow over the upper surface of said wing and flap and attach thereto under a predetermined set of conditions, the improvement comprising means for varying only the horizontal divergence of the jet exhaust as it passes over the upper surface of said wing and flap to control the vertical thickness of the jet exhaust and its attachment to said upper surface of said wing and flap.

5. The improvement claimed in claim 4 wherein said means for controlling the divergence of the jet exhaust comprises at least one panel forming a portion of the nozzle of said jet engine, said panel being movable between an inward position wherein the jet exhaust divergence is restricted and an outward position wherein the jet exhaust is allowed to diverge through an opening created by the movement of said panel to said outward position.

6. The improvement claimed in claim 5 wherein said at least one panel is located immediately above the upper surface of said wing.

7. The improvement claimed in claim 5 including a pair of panels forming a portion of the exhaust nozzle of said jet engine, said panels being located on either side of said exhaust nozzle immediately above the upper surface of said wing; said panels being movable between inward positions wherein the jet exhaust divergence is restricted and outward positions wherein the jet exhaust is allowed to diverge through openings created by the movement of said panels to said outward positions.

8. The improvement claimed in claim 4 wherein said means for controlling the divergence of the jet exhaust comprises at least one vane mounted on the upper surface of said wing immediately behind the nozzle of said jet engine.

9. The improvement claimed in claim 8 wherein said vane is aerodynamically shaped in cross-section so as to have a high pressure side and a low pressure side, the high pressure side of said vane being located toward the longitudinal axis defined by said jet engine and the low pressure side of said vane being remote from the longitudinal axis defined by said jet engine.

10. The improvement claimed in claim 8 including a second vane located on the upper surface of said wing immediately behind the nozzle to said jet engine, said first and second vanes being located on either side of the longitudinal axis defined by said jet engine near the outer sides of said exhaust nozzle.

11. The improvement claimed in claim 10 wherein said vanes are aerodynamically shaped in cross-section so as to have high pressure and low pressure sides, the high pressure sides of said vanes being located toward the longitudinal axis defined by said jet engine and the low pressure side of said vanes being remote from the longitudinal axis defined by said jet engine.

* * * * *